(12) United States Patent
Vasseur et al.

(10) Patent No.: US 12,407,581 B1
(45) Date of Patent: Sep. 2, 2025

(54) MULTI-AGENT COORDINATION FOR NETWORK ANOMALY DETECTION, TROUBLESHOOTING, AND REMEDIATION USING LANGUAGE MODELS

(71) Applicant: Cisco Technology, Inc., San Jose, CA (US)

(72) Inventors: Jean-Philippe Vasseur, Combloux (FR); Grégory Mermoud, Venthône (CH); Eduard Schornig, Haarlem (NL); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 8 days.

(21) Appl. No.: 18/592,858

(22) Filed: Mar. 1, 2024

(51) Int. Cl.
*H04L 41/16* (2022.01)
*H04L 41/0631* (2022.01)

(52) U.S. Cl.
CPC .......... *H04L 41/16* (2013.01); *H04L 41/0631* (2013.01)

(58) Field of Classification Search
CPC ........................... H04L 41/16; H04L 41/0631
See application file for complete search history.

(56) References Cited

U.S. PATENT DOCUMENTS

| | | |
|---|---|---|
| 2019/0347148 A1 | 11/2019 | Gomes Pereira et al. |
| 2019/0356553 A1 | 11/2019 | Mermoud et al. |
| 2022/0345356 A1 | 10/2022 | Triplet et al. |
| 2023/0004487 A1 | 1/2023 | Bitla |
| 2023/0333903 A1 | 10/2023 | White et al. |
| 2025/0080396 A1* | 3/2025 | Titon ..................... H04L 43/08 |

* cited by examiner

*Primary Examiner* — Philip C Lee
(74) *Attorney, Agent, or Firm* — Merchant & Gould P.C.; Kenneth J. Heywood

(57) ABSTRACT

In one implementation, a troubleshooting agent executed by a device receives an indication of an anomaly detected in a network by an anomaly detection agent. The troubleshooting agent uses a language model to determine a root cause of the anomaly. The troubleshooting agent determines whether automated remediation for the root cause is allowed by a policy. The troubleshooting agent provides a remediation request to a remediation agent in the network to remediate the root cause of the anomaly, when the policy allows automated remediation for the root cause.

18 Claims, 10 Drawing Sheets

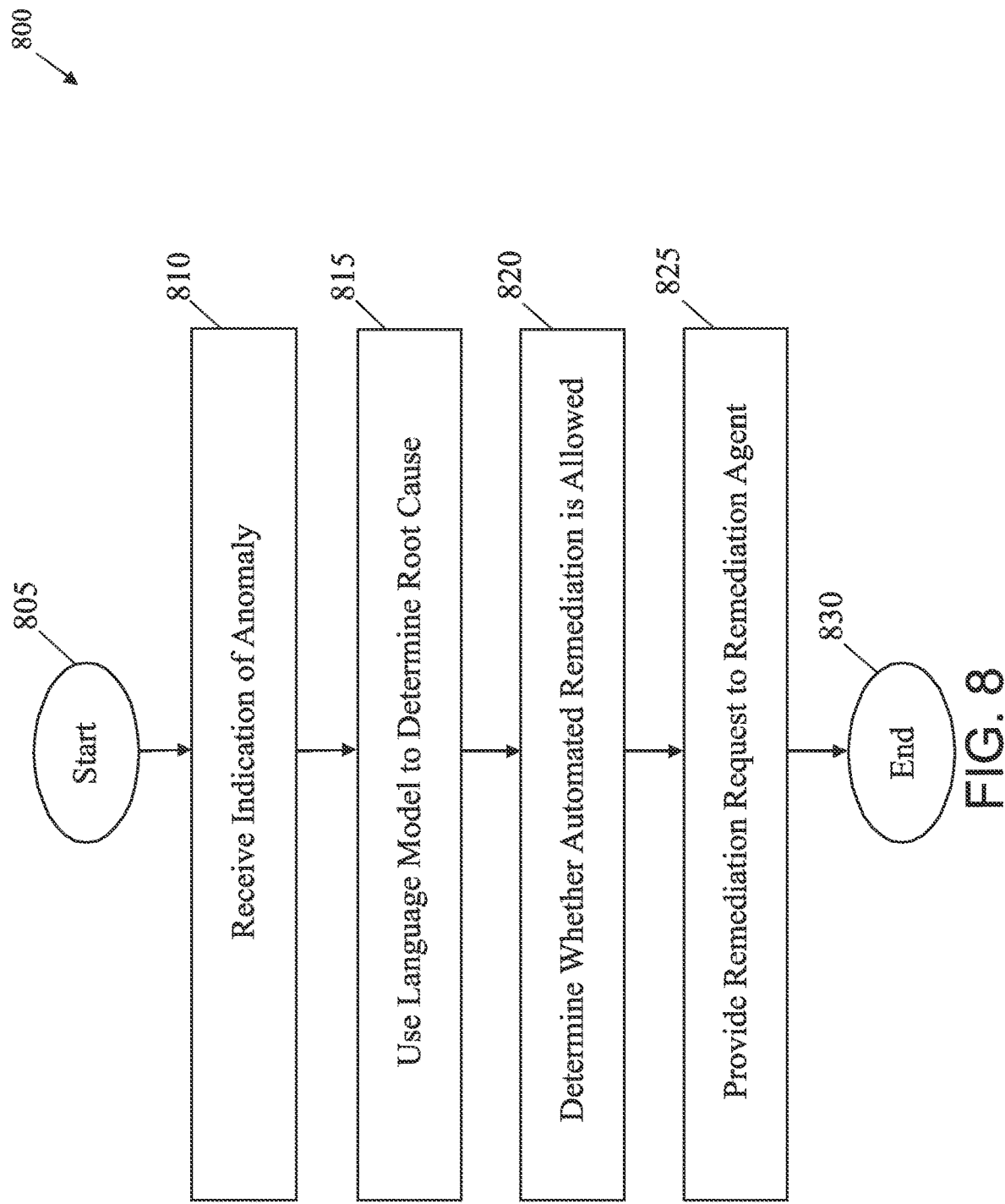

MULTI-AGENT COORDINATION FOR NETWORK ANOMALY DETECTION, TROUBLESHOOTING, AND REMEDIATION USING LANGUAGE MODELS

TECHNICAL FIELD

The present disclosure relates generally to multi-agent coordination for network anomaly detection, troubleshooting, and remediation using language models.

BACKGROUND

The recent breakthroughs in large language models (LLMs), such as ChatGPT and GPT-4, represent new opportunities across a wide spectrum of industries. More specifically, the ability of these models to follow instructions now allow for them to interact with tools (also called plugins) that are able to perform tasks such as searching the web, executing code, etc. In addition, agents can even be written to perform many tasks by chaining multiple calls to one or more LLMs.

However, adapting LLM-based agents to perform tasks in a computer network remains challenging because of the level of complexity found in a typical network. Indeed, computer networks often include thousands of devices communicating with one another in such a way that a single device malfunctioning can have a ripple effect across the network. Consequently, even if an agent were to detect when something is wrong with the network, discerning the underlying cause of the issue, as well as initiating any remediation for the issue, adds increasing levels of difficulty. For instance, it is relatively easy to determine that an endpoint is unable to connect to a network versus determining that its lack of connectivity is due to a wireless access point being overloaded.

BRIEF DESCRIPTION OF THE DRAWINGS

The implementations herein may be better understood by referring to the following description in conjunction with the accompanying drawings in which like reference numerals indicate identically or functionally similar elements, of which:

FIG. 8 illustrates an example simplified procedure for multi-agent coordination for network anomaly detection, remediation, and troubleshooting using language models.

DESCRIPTION OF EXAMPLE IMPLEMENTATIONS

Overview

According to one or more implementations of the disclosure, a troubleshooting agent executed by a device receives an indication of an anomaly detected in a network by an anomaly detection agent. The troubleshooting agent uses a language model to determine a root cause of the anomaly. The troubleshooting agent determines whether automated remediation for the root cause is allowed by a policy. The troubleshooting agent provides a remediation request to a remediation agent in the network to remediate the root cause of the anomaly, when the policy allows automated remediation for the root cause.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
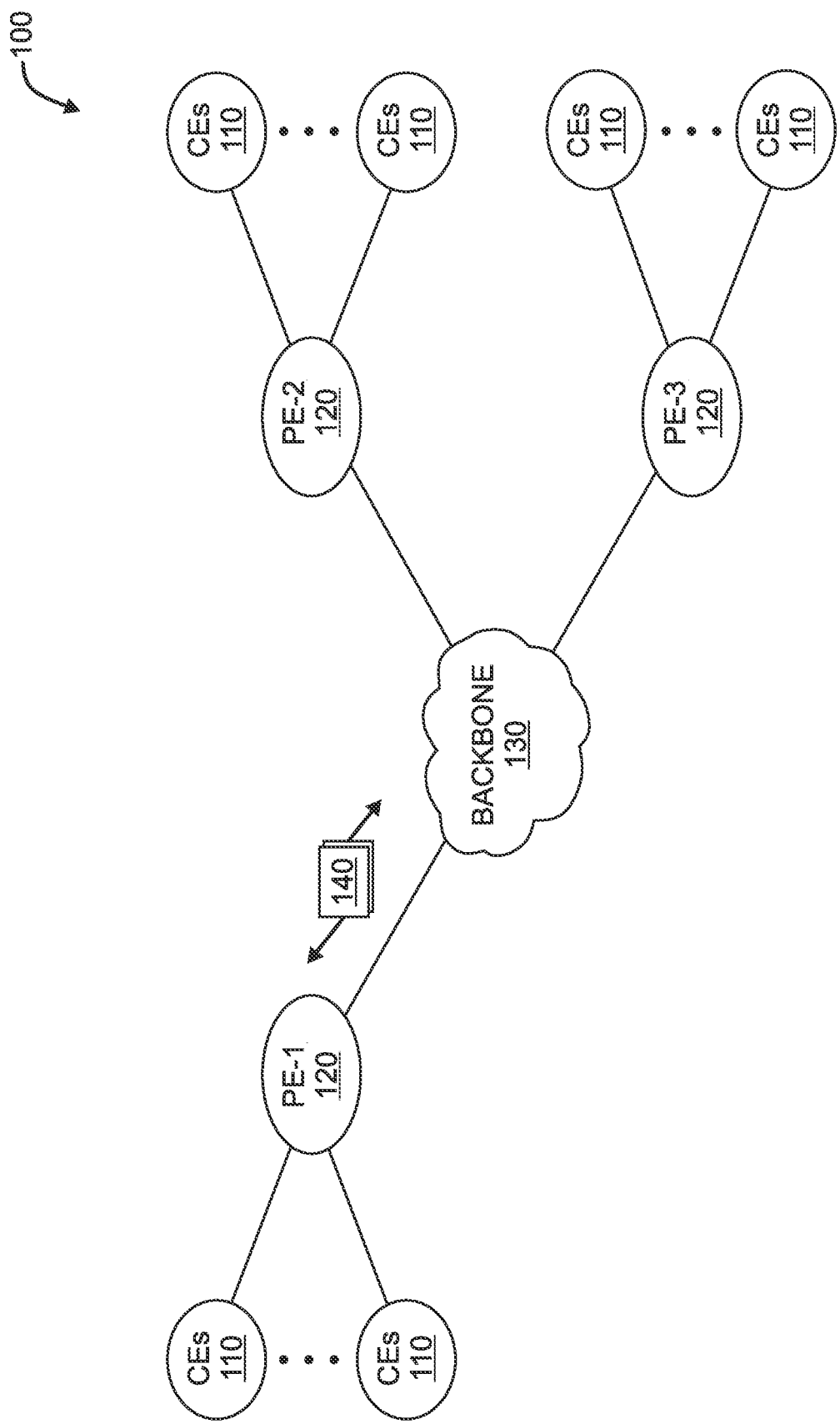
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
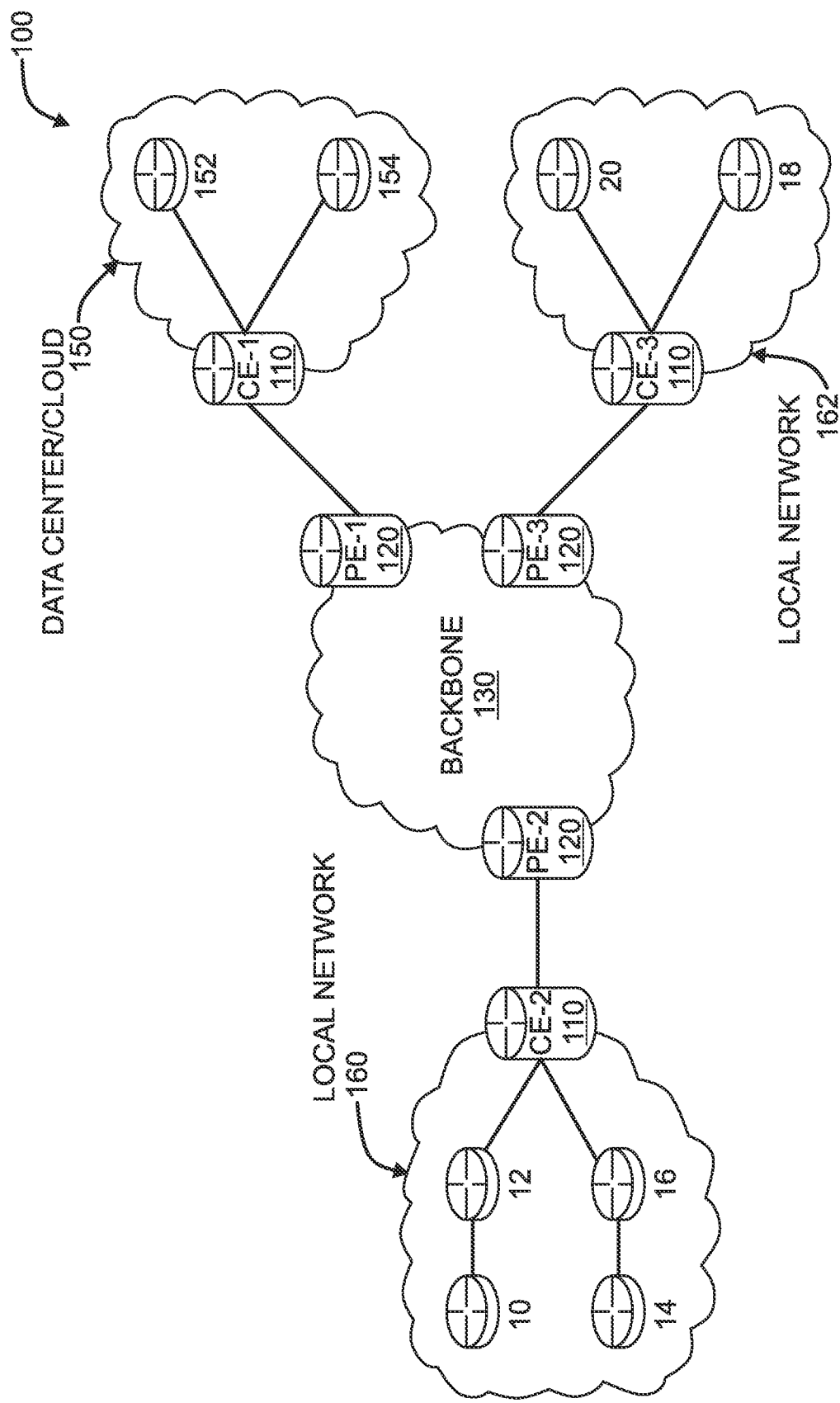

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
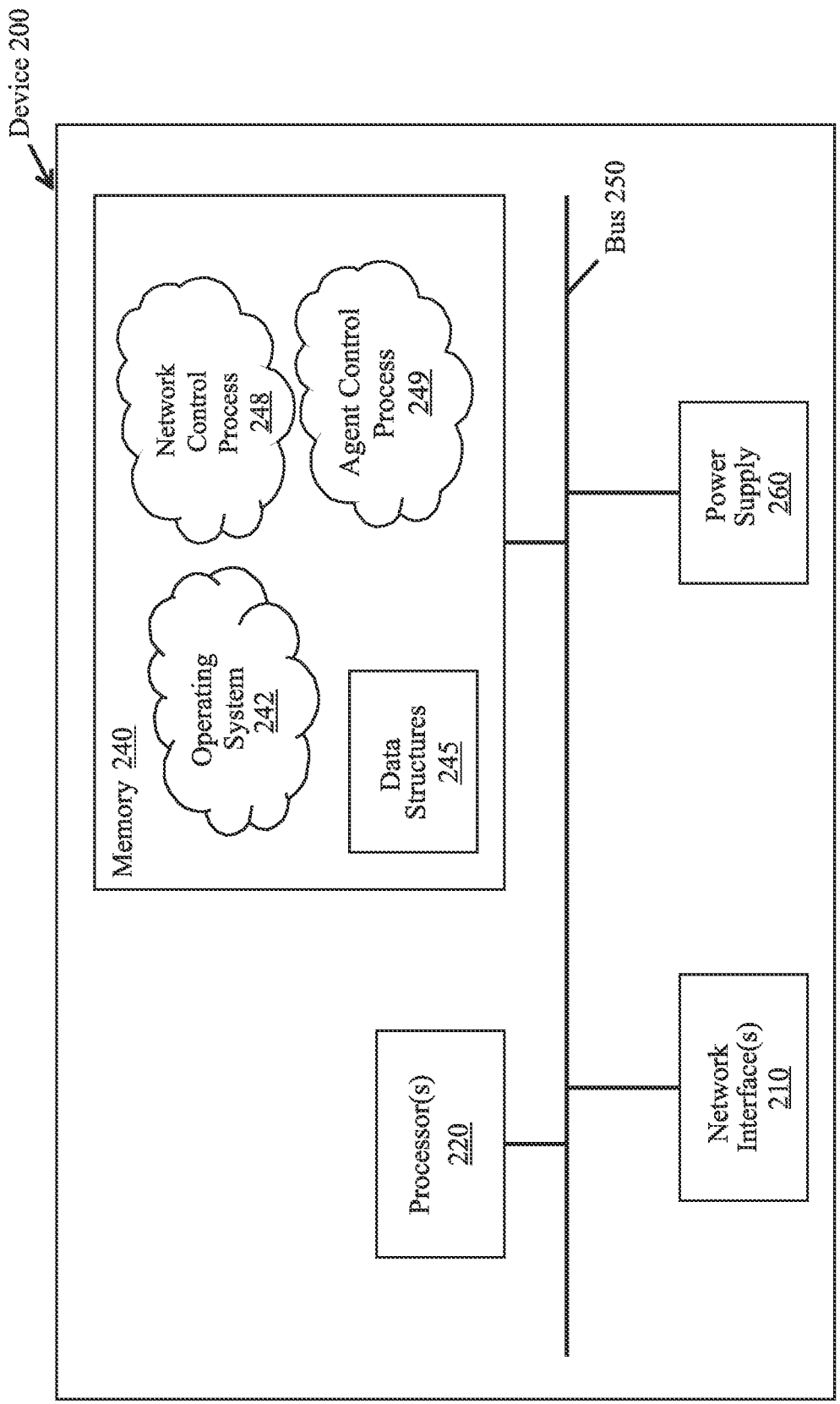
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or an agent control process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, network control process 248 and/or agent control process 249 may include computer executable instructions that, when executed by processor(s) 220, cause device 200 to perform the techniques described herein. To do so, in some implementations, network control process 248 and/or agent control process 249 may utilize machine learning. In various implementations, network control process 248 and/or agent control process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or agent control process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or agent control process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network control process 248 may use a generative model to generate synthetic network traffic based on existing user traffic to test how the network reacts. Example generative approaches can include, but are not limited to, generative adversarial networks (GANs), large language models (LLMs), other transformer models, and the like.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QOS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
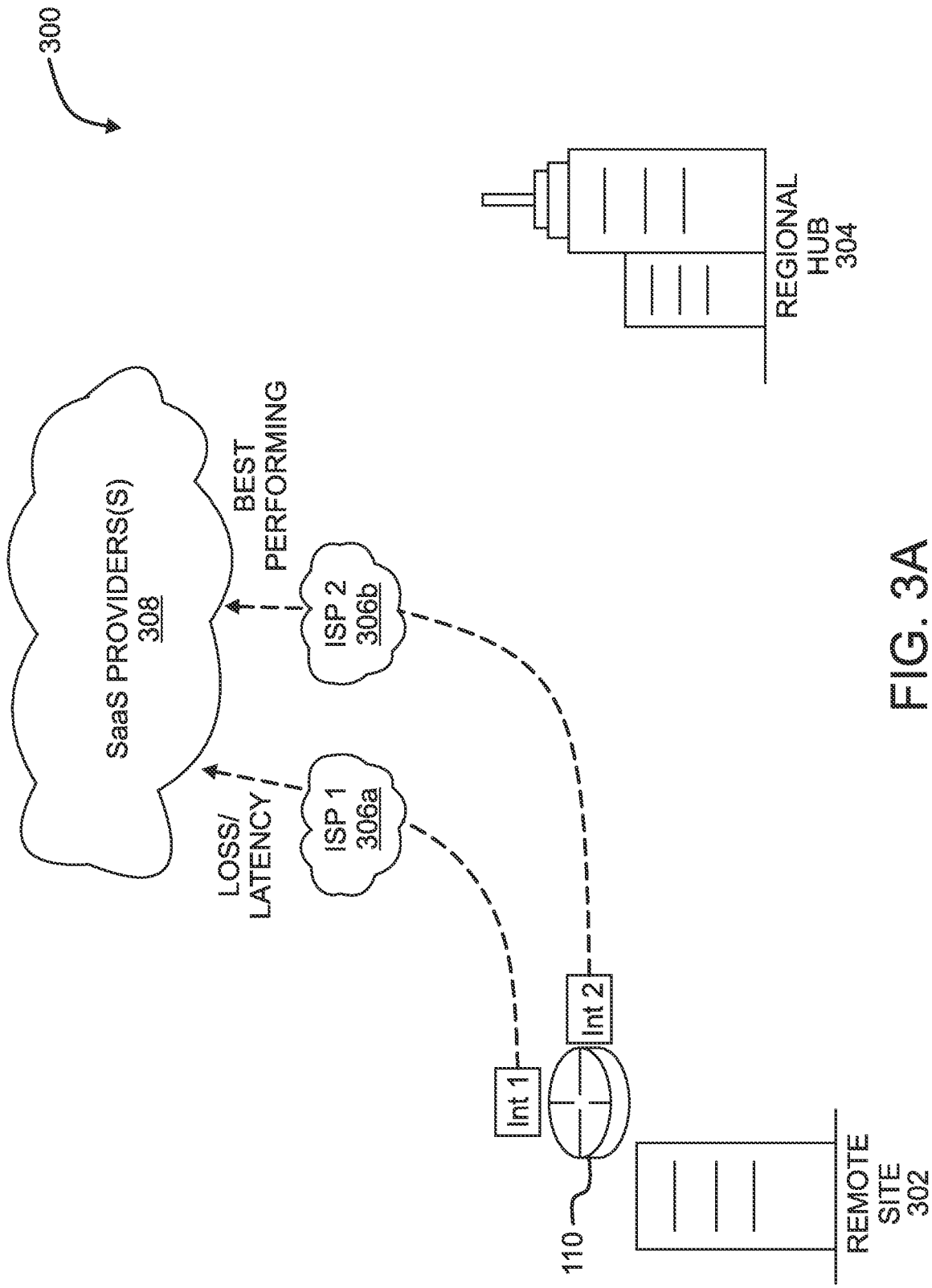
FIGS. 3A-3B illustrate example network deployments.
Figure 3B:
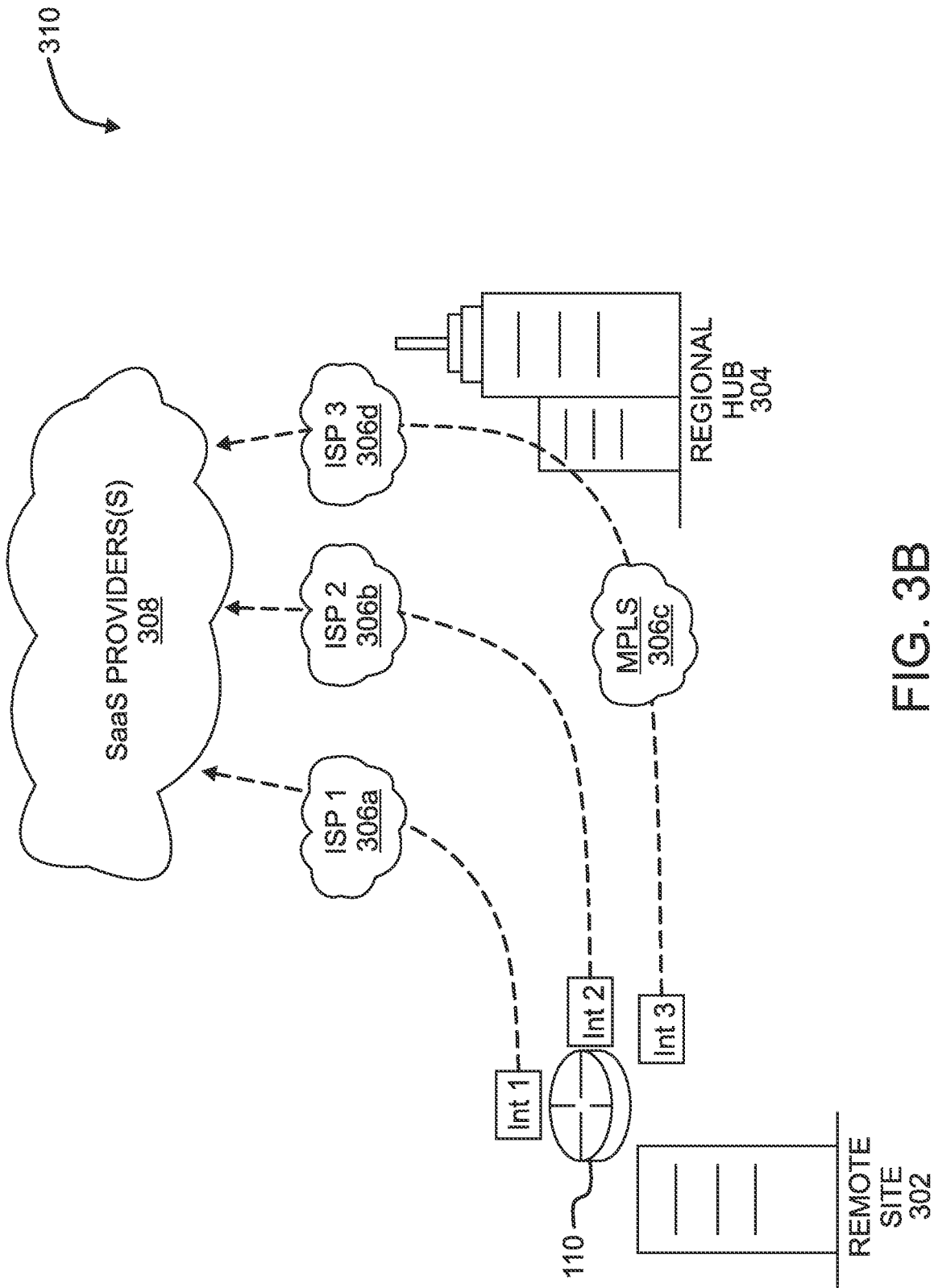

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
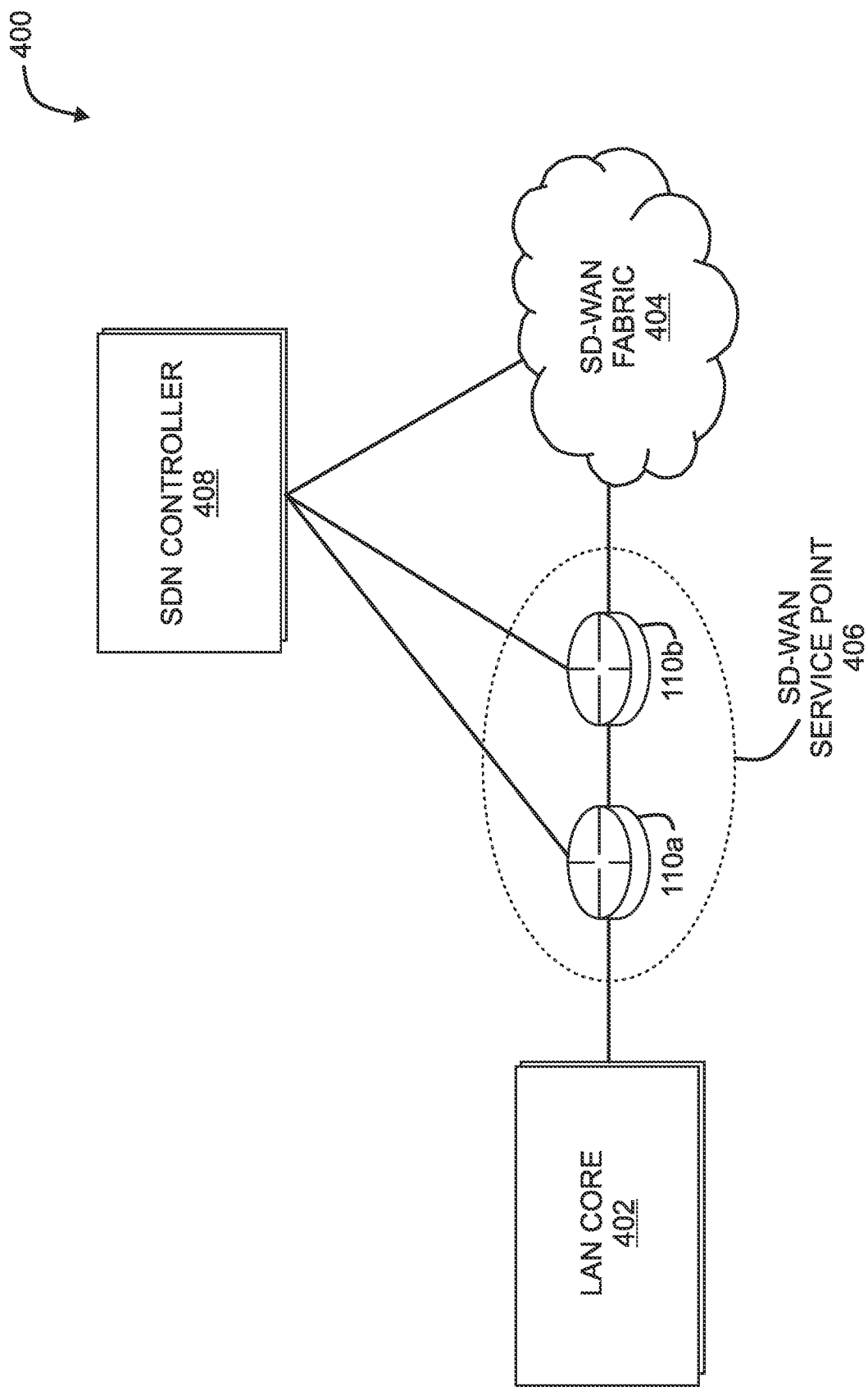
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

Language Model-Based Ticketing Service

The recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers (e.g., SD-WAN, DNAC, ACI, etc.). Moreover, network issues can manifest in various forms, stemming from a multitude of factors, each with its own level of complexity.

The introduction of plugins is a major development that enables LLM-based agents to interact with external systems and empower new domain-specific use cases. In the context of communication networks, the utilization of plugins allows LLMs to engage with documentation repositories, tap into knowledge bases, and interface with live network controllers and devices potentially opening the path to LLMs undertaking more complex tasks such as on-demand troubleshooting, device configuration, and performance monitoring. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

One area where LLM-based agents can offer substantial benefits is in the context of technical support for organizations. Traditionally, network troubleshooting in many organizations is structured into multiple tiers (L1, L2, L3) based on the level of expertise and experience of support engineers, with each tier handling increasingly complex issues. When a new support ticket is initiated, it typically follows a tiered process. Initially, the ticket is assigned to an L1 support engineer who conducts basic checks and gathers initial information. If no obvious problem is identified, the ticket is then escalated to an L2 support engineer who collects more detailed data and conducts in-depth troubleshooting.

During the troubleshooting process, the engineer may also refer to past tickets to review the root causes and troubleshooting steps taken for similar issues. While modern ticketing systems can automatically identify related problems and reference them in the new ticket, it remains the responsibility of the support engineer to examine each issue and perform the necessary troubleshooting steps to determine whether the same root cause applies or if the problem is entirely new. If the L2 support engineer is unable to identify the root cause and resolve the issue, it may be further escalated to a higher-level support group.

This entire troubleshooting process can be time-consuming as the issue is transferred between different layers of the support organization, or even different specialized domain experts or teams. This is especially true for complex issues where identifying the root cause is challenging and may require traversing all support tiers. Another drawback of this typical approach is that it can result in wasted time and resources, as multiple engineers may concurrently investigate the same issue. For instance, in the case of network congestion at a large site, multiple users from that site may open support tickets in quick succession. Each ticket may be assigned to a different L1 support engineer, who then independently performs initial debugging tasks before potentially escalating the issue to a higher-level support team. In some cases, the L2 team may eventually recognize the similarity between the new tickets and analyze the collected information to identify common elements (such as the same site, equipment, WAN circuit, etc.), which can significantly narrow down the scope of the investigation. In other cases, these similarities may not be immediately apparent, leading to multiple L2 engineers investigating the same issue, simultaneously.

According to various implementations, upon receiving a new ticket, the system introduced herein automatically generates step-by-step troubleshooting instructions by analyzing past similar issues and executes them in the network environment. This is achieved by leveraging plugins that allow a troubleshooting agent to fetch data via API integrations with network controllers (e.g., DNAC, ACI, SD-WAN) and/or monitoring systems (e.g., Network Management Systems). The primary goals are to either directly identify the root cause of the problem or, when direct identification is not feasible, gather pertinent information such as logs, network context, and performance statistics to facilitate the work of human support engineers. Finally, the system can categorize similar tickets based on common elements, such as site location, WAN gateway, circuit, or log patterns, or based on identified root causes. These groups of tickets are then consolidated into a master issue and escalated to the appropriate technical contacts for remediation.

Illustratively, the techniques described herein may be performed by hardware, software, and/or firmware, such as in accordance with agent control process 249, which may include computer executable instructions executed by the processor 220 (or independent processor of interfaces 210) to perform functions relating to the techniques described herein, such as in conjunction with network control process 248.

Figure 5:
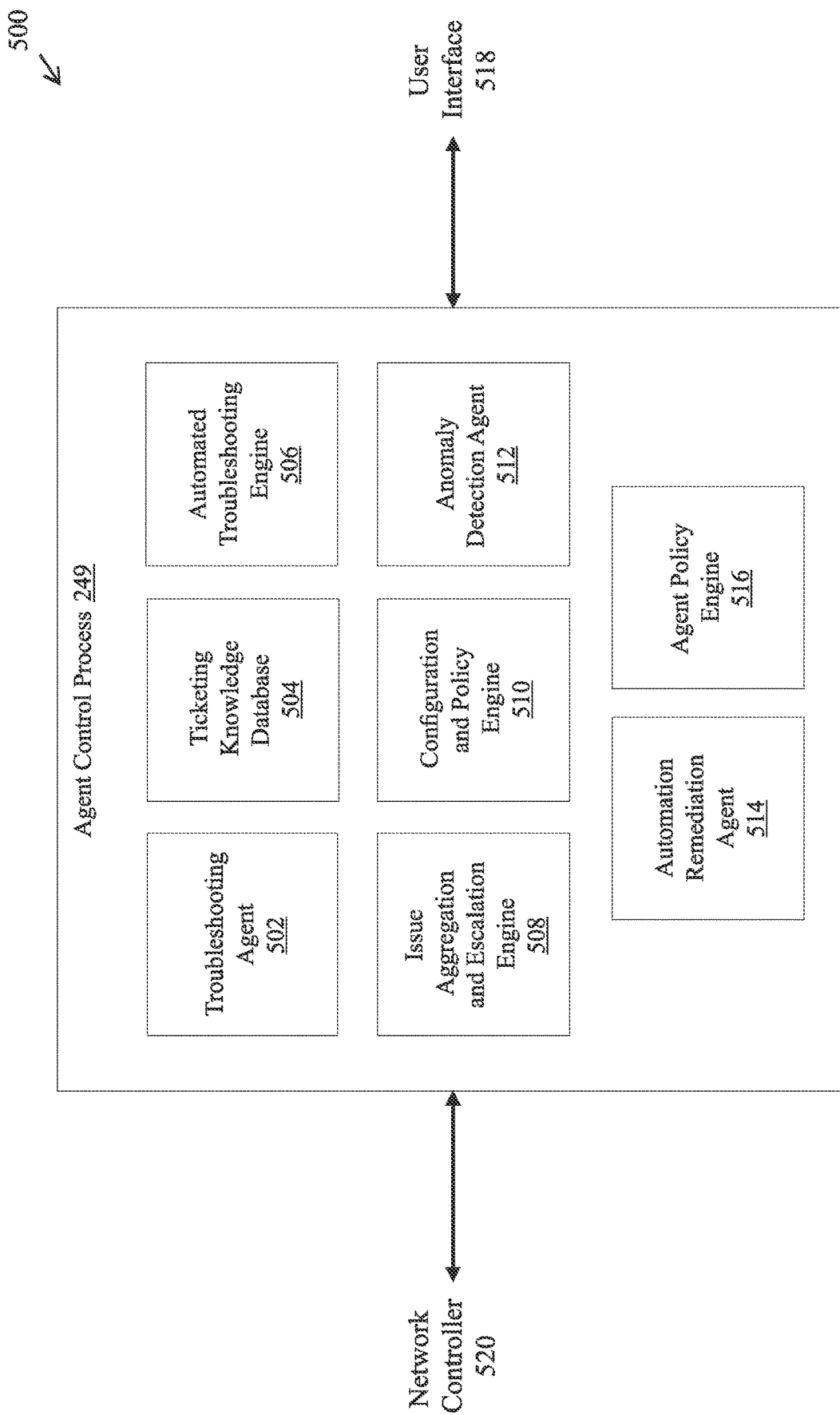
FIG. 5 illustrates an example architecture for network anomaly detection, remediation, and troubleshooting.

FIG. 5 illustrates an example architecture 500 for network anomaly detection, remediation, and troubleshooting, according to various implementations. At the core of architecture 500 is agent control process 249, which may be executed by a controller for a network or another device in communication therewith. For instance, agent control process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, agent control process 249 may interface with a network controller 520, either locally or via a network, such as via one or more application programming interfaces (APIs), etc. In addition, agent control process 249 may communicate with any number of user interfaces, such as user interface 518.

Figure 6:
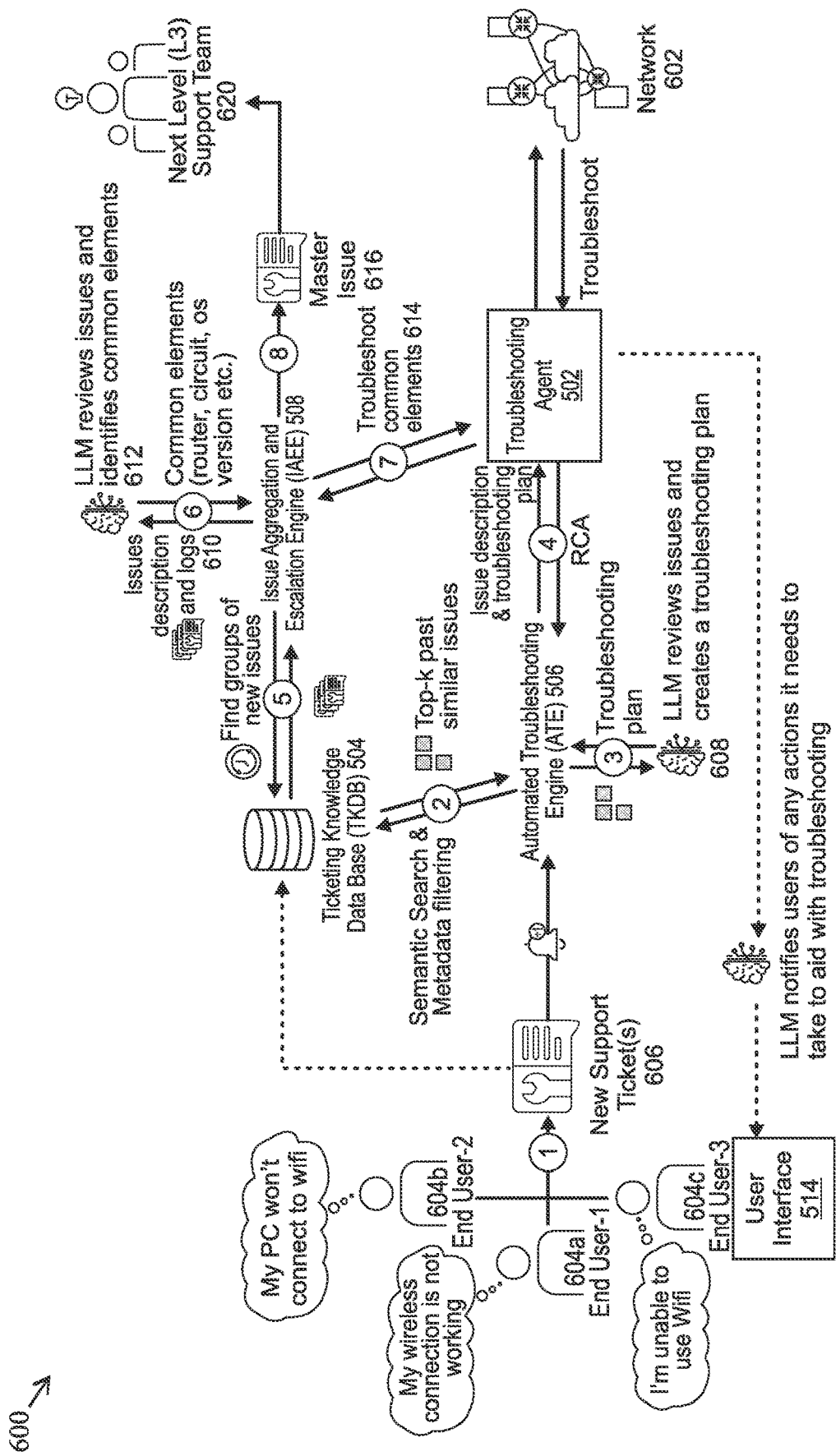
FIG. 6 illustrates an example of the interactions of the components of the architecture in FIG. 5 to provide a language model-based ticketing service.

As shown, agent control process 249 may include any or all of the following components: a troubleshooting agent 502, a ticketing knowledge database 504, an automated troubleshooting engine 506, an issue aggregation and escalation engine 508, a configuration and policy engine 510, an anomaly detection agent 512, automation remediation agent 514, and/or an agent policy engine 516. As would be appreciated, the functionalities of these components may be combined or omitted, as desired. In addition, these components may be implemented on a singular device or in a distributed manner, in which case the combination of executing devices can be viewed as their own singular device for purposes of executing agent control process 249. FIG. 6 illustrates an example 600 of the interactions of the components of architecture 500.

According to various implementations, troubleshooting agent 502 may leverage one or more LLMs to troubleshoot an issue, find the actual root cause for the issue, and/or suggest a set of one or more actions to fix the issue. Let ai denote an action used for troubleshooting an issue I and let Ai denote an action (configuration change) on the network (closed-loop control). In various instances, issue I may be raised by an end user, a set of users, or detected automatically within the network.

The set of actions Ai required to solve the issue I may be determined on-the-fly by the LLM of troubleshooting agent 502, statically determined according to a cookbook for each trajectory made of a set of action ai, or the like. For example, a static cookbook may be used to map a specific ak to set of actions Ak,l. Consider the action ak="Check the priority queue length of a router," a static set of action ak,l may be used to trigger a set of l action on the network (e.g., "Change the weight of the priority queue," "Modify the WRED parameter for the high priority queue"). In another implementation, the system may discover the set of required actions related to a given root cause identified thanks to a set of action ai, using reinforcement learning or another suitable approach.

If the root cause identified by troubleshooting agent 502 for issue I is eligible for automated action (e.g., according to a policy), troubleshooting agent 502 may perform any or all of the following:

Troubleshooting agent 502 retrieves the set of action Ai for the root cause of issue I after activating a timer T (max time to solve the issue)

Troubleshooting agent 502 may also employ various optimization criterion may be used for solving a given task T. For instance, troubleshooting agent 502 may solve some tasks with objective metrics such as reducing the processing time or improve accuracy even at the risk of involving more steps and tokens (cost). In the context of the techniques herein, the issue criticality may also drive the optimization criteria (e.g., time versus reliability versus cost). In one implementation, the optimization criteria may be unique and decided according to policy and criticality. In another implementation, troubleshooting agent 502 may trigger multiple actions in parallel, each with different optimization criterion. For example, for a given issue I, troubleshooting agent 502 may send a request to a first LLM with a first criteria (e.g., solve as quickly as possible, optimizing time) and send the same request to a second LLM with different optimization criteria (e.g., efficiency). In such a case, troubleshooting agent 502 may use the reply to the first request (set of resolution action Ai) to quickly fix the network, followed by using the second set of actions to optimize the resolution of the issue. Note that both requests may not overlap in terms of closed-loop actions, as well.

In other words, during execution, troubleshooting agent 502 may take questions as input, runs one or more steps that can consist in calling an LLM, or retrieve data from external systems such as network controllers and monitoring systems, and produces an answer as output. To do so, troubleshooting agent 502 may rely on external APIs to obtain data required to perform troubleshooting and monitoring actions.

In various implementations ticketing knowledge database 504 may take the form of a vector database or other database that has the role of storing the text contents of support tickets as vector embeddings and facilitating semantic searches of said ticket history. For instance, ticketing knowledge database 504 may leverage a vector database such as Chroma or Pinecone to achieve this role and leverage either SaaS based embedding services such as OpenAI or local open-source embedding models to vectorize the ticket contents. Besides the vector embeddings, for each ticket, ticketing knowledge database 504 may also store additional information as metadata, such as any or all of the following:

State: Unassigned, Open, Closed (Resolved)
Issue category: Poor connectivity, No connectivity etc.
Technology domain: Security, Wired Access, Wireless Access, etc.
End user satisfaction: A reflection of how satisfied the user was with the support interaction usually as a 1 (low) to 5 (high) score.
Ticket key performance indicators (KPIs): Metrics such as time to resolution, that measure the total time taken to resolve the tickets or any other KPIs relevant for the specific support organization.

In various implementations, automated troubleshooting engine 506 may perform several tasks, when it receives a new support ticket:

In a first step, it queries ticketing knowledge database 504 for similar issues using a combination of semantic search and metadata filters. Automated troubleshooting engine 506 may identify relevant past issues based on a certain threshold of similarity, however it may use additional criteria such as user satisfaction score to narrow down the scope.

In a second phase, automated troubleshooting engine 506 may sends the ticket contents to an LLM (e.g., the LLM of troubleshooting agent 502) specifically tasked with extracting the troubleshooting steps performed in each of the identified similar tickets and compose a step-by-step troubleshooting plan. Based on the available LLM context size, this operation may be performed as one step, with all past tickets being included in the same LLM prompt or using multiple steps. In this second instance, troubleshooting steps for each ticket are extracted separately followed by a second query to the LLM which is asked to combine all the steps in a troubleshooting plan.

The resulting troubleshooting plan may resemble an inverted tree structure, with common steps that are executed universally at the top, such as identifying the site to which the user is connected, determining the connection type, and assessing the overall health status. These initial steps then branch out into several trajectories, each corresponding to potential root causes or specific troubleshooting paths. For example, these branches might involve verifying the health of the Wireless Access Point (AP), checking the uptime of the upstream switch, or assessing the load on the WAN connection, among other possibilities.

Furthermore, within each branch of the troubleshooting tree, there may exist two distinct types of steps:

1. Autonomous steps: these are sets of troubleshooting steps or actions that troubleshooting agent 502 can execute directly without requiring user intervention.
2. User Steps: these steps are actions that are part of the troubleshooting plan which need to be carried out by the end-users themselves. These actions might include actions like rebooting a host device or software client, modifying local configuration parameters, or collecting specific logs or information.

Next, automated troubleshooting engine 506 may send the troubleshooting plan to troubleshooting agent 502 that can interact with network controllers and monitoring systems to execute it and identify the root cause of the issue. To reduce the burden on the end user, troubleshooting agent 502 may be directed to initially explore the branches within the troubleshooting plan that exclusively consist of autonomous steps. This approach aims to identify the root cause without requiring any direct involvement from the end user. If, however, no root cause can be determined following the exploration of these autonomous branches, troubleshooting agent 502 may proceed to investigate branches that necessitate user interaction.

In such cases where user interaction is required, troubleshooting agent 502 may engage a user-facing LLM with the purpose of communicating with the end user. For instance, it may request that the end user perform certain actions, provide additional clarifications, or submit logs, thereby facilitating the troubleshooting process.

Upon completion of all the troubleshooting steps, two potential outcomes are possible:

Successful root cause identification: troubleshooting agent 502 successfully identifies the root cause of the issue. Automated troubleshooting engine 506 may engage with a system that aims to leverage automated self-healing capabilities to rectify the issue without human intervention. Alternatively, the root cause may be documented in the ticket and forwarded to a human support agent for remediation.

No root cause is identified: the second potential scenario arises when troubleshooting agent 502 is unable to successfully identify the root cause. In one embodiment, automated troubleshooting engine 506 handles this situation by initiating the entire process again, starting with a new query to the ticketing knowledge database 504 for a new set of similar issues. Additional filters may be specified to refine the search, excluding issues that match root causes (RCAs) that have already been ruled out. This process can be iterated multiple times, continuing until either a root cause is either discovered, or a predefined maximum number of attempts is reached. Alternatively, in a second embodiment, automated Automated troubleshooting engine 506 may opt to utilize a system that facilitates the request for assistance from a human Subject Matter Expert (SME) when automated troubleshooting proves inconclusive.

In various implementations, issue aggregation and escalation engine 508 assumes the responsibility of continuously monitoring ticketing queues for the discovery of similar issues. Its primary function is to automatically aggregate similar issues into master tickets that can be quickly escalated to higher-level support teams.

Issue aggregation and escalation engine 508 may routinely query ticketing knowledge database 504 for tickets that are in an open state and employs clustering techniques, such as K-means clustering or Hierarchical Clustering, to group similar tickets together. These clusters represent sets of tickets that share common characteristics or problem descriptions.

When a new cluster of issues is identified, issue aggregation and escalation engine 508 may use an LLM to analyze the network information already collected with the tasks of identifying common network elements, such as a shared site, device, or circuit. For example, it may discover that all users reporting wireless issues are connected to the same site and wireless access point (AP). Additionally, it can identify common user environment elements, such as software versions, device types, or specific application issues. For instance, it might find that users with a particular device type are experiencing connectivity problems with the wireless network. In yet another instance, issue aggregation and escalation engine 508 may identify a combination of both network and user common elements such as all users with a specific software version have issues authenticating when using APs connected to a certain wireless controller (WLC).

If no root cause was pinpointed during earlier troubleshooting stages (e.g., by automated troubleshooting engine 506), issue aggregation and escalation engine 508 may employ troubleshooting agent 502 once again, this time the focus is on performing more targeted troubleshooting of the common elements identified. For instance, it may investigate the health of a specific router, or a network interface associated with the common issues.

Finally, issue aggregation and escalation engine 508 may document its findings, including the common elements it identified and any additional troubleshooting results, into a master ticket. This master ticket is then escalated to the next level of support teams for resolution. Moreover, as new support tickets matching the same master issue are generated, they are automatically cross-referenced to streamline the resolution process. New support tickets matching the same master issue are automatically referenced as they come in.

The fourth component of the solution is configuration and policy engine 510 which allows a support organization administrator to configure a set of constraints on the Virtual Assistant operations. To this end, several constraints can be configured, such as any or all of the following:

Issues of interest: which support queues and categories of issues for which the system should be engaged. For example, the agent may be asked to engage for wireless campus issues but not data center related ones.

Budget: what is the maximum token number (or cost) the agent can spend to perform the automated troubleshooting?

Past issue count-count of past issues to be used for deriving the troubleshooting plan by automated troubleshooting engine 506.

Escalation cluster size: the minimum number of similar issues that issue aggregation and escalation engine 508 needs to identify before opening a master issue and escalating to the next level of support.

FIG. 6 illustrates an example 600 of the interactions of the components of the architecture in FIG. 5. As shown, assume that there are various end users in a network 602, such as end user 604a, end user 604b, and end user 604c. First, one or more of these users may open one or more new support tickets 606, such as via a user interface 518, which is sent to automated troubleshooting engine 506, as shown at (1).

In turn, automated troubleshooting engine 506 may perform a semantic search (and metadata filtering) of ticketing knowledge database 504 for the one or more new support tickets 606, as shown at (2). Then, automated troubleshooting engine 506 may leverage an LLM 608 to devise a troubleshooting plan, based on the k-number of past similar issues to those raised in the one or more new support tickets 606, as shown at (3). Automated troubleshooting engine 506 then sends the issue description and troubleshooting plan to troubleshooting agent 502, which uses this information to perform troubleshooting in network 602 and returns the identified root causes (RCAs) back to automated troubleshooting engine 506, at (4). Troubleshooting agent 502 or automated troubleshooting engine 506 may then formulate a notification of any actions that users 604 need to take to resolve the issue.

In cases when ticketing knowledge database 504 finds a group of new issues, at (5), it may notify issue aggregation and escalation engine 508. In turn, issue aggregation and escalation engine 508 may leverage an LLM 612 (e.g., the LLM of agent 502) to identify common elements (e.g., router, circuit, SO version, etc.) among the issue descriptions and logs 610, at (6). Issue aggregation and escalation engine 508 may then send ask troubleshooting agent 502 to troubleshoot the common elements 614, at (7). In addition, issue aggregation and escalation engine 508 may also aggregate tickets into a master issue 616 by seeking review from an L3 support team 620, at (8).

Multi-Agent Coordination for Network Anomaly Using Language Models

While support tickets represent one potential pathway to identifying and troubleshooting issues in a network, another potential pathway lies in the use of anomaly detection agents in the network to trigger troubleshooting. In various aspects, the techniques herein introduce a multi-agent approach whereby anomaly detection agents, troubleshooting agents, and remediation agents may operate in conjunction with one another to not only detect potential network issues, but to troubleshoot them and initiate remediation, automatically.

Specifically, according to various implementations, a troubleshooting agent executed by a device receives an indication of an anomaly detected in a network by an anomaly detection agent. The troubleshooting agent uses a language model to determine a root cause of the anomaly. The troubleshooting agent determines whether automated remediation for the root cause is allowed by a policy. The troubleshooting agent provides a remediation request to a remediation agent in the network to remediate the root cause of the anomaly, when the policy allows automated remediation for the root cause.

Figure 7:
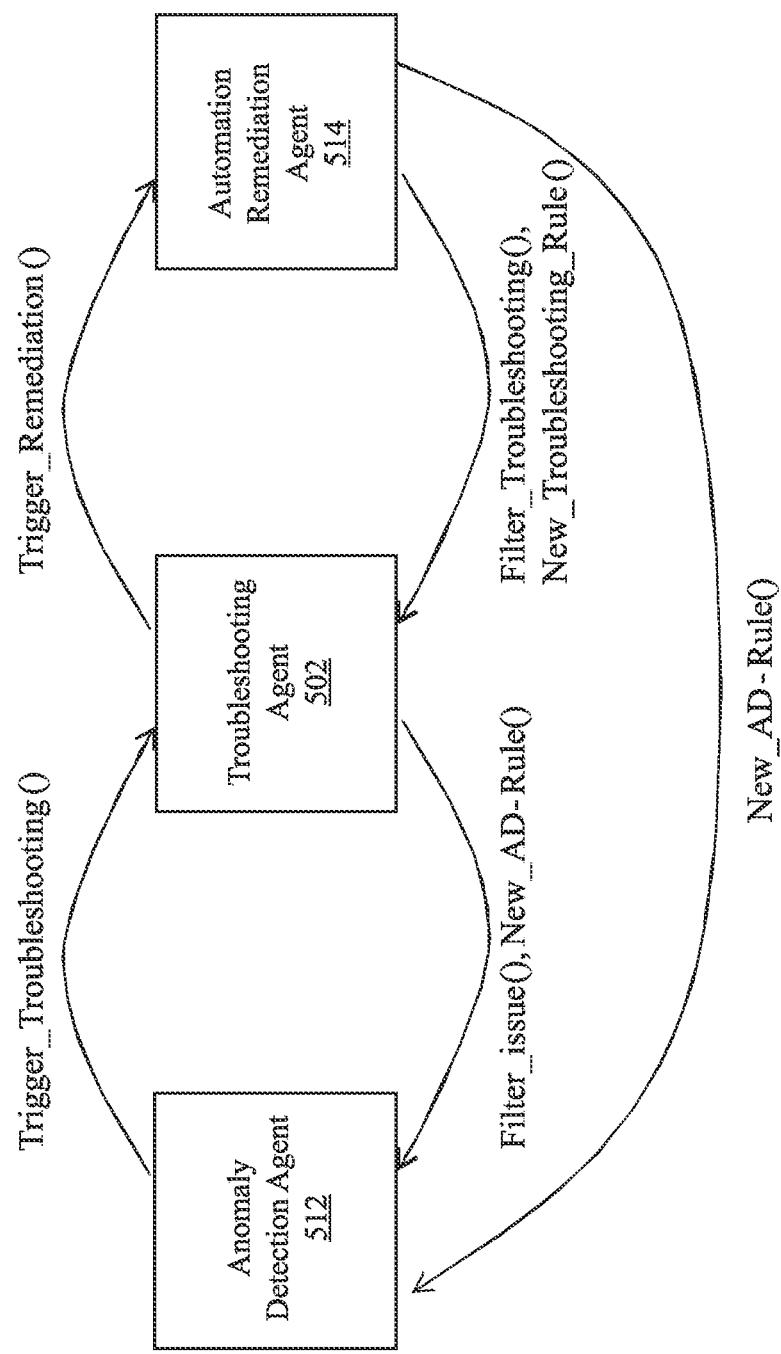
FIG. 7 illustrates an example of the interactions of different agents in a network.

Referring again to FIG. 5, architecture 500 may also perform the automated identification, troubleshooting, and remediation of network issues using a multi-agent approach by coordinating the interactions of troubleshooting agent 502, anomaly detection agent 512, and automation remediation agent 514. More specifically, as shown in example 700 in FIG. 7, these agents may interact using a series of custom messages:

1. When anomaly detection agent 512 detects an anomaly (e.g., using machine learning, based on a predefined threshold, etc.), it may send this message to troubleshooting agent 502.
2. On receipt of the Trigger_Troubleshooting( ) message, troubleshooting agent 502 may trigger its AI-powered troubleshooting to assess the root cause of the anomaly.
   a. If troubleshooting agent 502 finds the root cause:
      i. Troubleshooting agent 502 sends a Trigger_Remediation( ) message to automation remediation agent 514 to trigger an attempt to remediate the issue, if allowed by policy.
      ii. Troubleshooting agent 502 may also send a New_AD_Rule( ) to anomaly detection agent 512 with a new anomaly detection rule
   b. If troubleshooting agent 502 does not find the root cause:
      i. Troubleshooting agent 502 may instead send a Filter_Issue( ) message to anomaly detection agent 512 to start filtering the condition from leading to additional anomaly alerts
3. On receipt of the Trigger_Remediation( ) message, automation remediation agent 514 may attempt to remediate the detected issue
   a. If automation remediation agent 514 fixes the issue, it may send a New_AD_Rule( ) message to anomaly detection agent 512 and a New_Troubleshooting_Rule( ) message to troubleshooting agent 502.
   b. If automation remediation agent 514 does not fix the issue, it may instead send a Filter_Troubleshooting( ) message to troubleshooting agent 502.

In various implementations, agent policy engine 516 may oversee the various interactions between troubleshooting agent 502, anomaly detection agent 512, and automation remediation agent 514 that specifies:

Which anomaly detection agent 512 can interact with which troubleshooting agent 502

Which troubleshooting agent 502 can interact with which automation remediation agent 514

Which anomaly detection agent 512 can interact with which automation remediation agent 514.

An administrator may define such policies via user interface 518 for implementation by agent policy engine 516. In some instances, agent policy engine 516 may implement more granular policies to indicate the list of messages that could be sent according to specific rules. For example, the network administrator may allow a given troubleshooting agent 502 to send a Trigger_Remediation ( ) message to a particular automation remediation agent 514 only for some specific issues that should be automatically remediated but not for others. In another embodiment, rules could be added allowing for a maximum number of attempts for triggering a troubleshooting action for a given (type) of issues or an event matching specific criterion (e.g., username, severity of the issue, etc.).

As noted above, troubleshooting in a computer network is typically initiated today by a human submitting a support ticket. However, an evolution over this approach would be for anomaly detection agent 512 to instead trigger this assessment by issuing a Trigger_Troubleshooting( ) message to troubleshooting agent 502. To this end, anomaly detection agent 512 may make use of a machine learning model such as Gradient Boosted Trees to predict the "normal" values for a set of network performance metrics, such as the time to join, percentage of roaming failures, and expected throughput per application, to mention a few. When anomaly detection agent 512 detects an anomaly, it may include any or all of the following in its Trigger_Troubleshooting( ) to troubleshooting agent 502:

Description of the anomaly: e.g., time to join the network is abnormal

List of entities involved: e.g., Access Point IP address, users affected, time-of-day the issues was detected, estimated impact on SLA Historical information: whether the anomaly was raised in the past, at which frequency, etc.

Optional feedback: from a user about the "quality of the anomaly" (some anomaly detection systems support the ability to get user feedback about the level of quality/interest a user has in the anomaly).

Upon receiving the Trigger_Troubleshooting( ) troubleshooting agent 502 may initiate troubleshooting using its capabilities described previously. For instance, troubleshooting agent 502 may leverage an LLM to summarize the content of the Trigger_Troubleshooting( ) message (e.g., type of anomaly, involved entities, etc.). Of course, simpler implementations provide for troubleshooting agent 502 to use rule-based troubleshooting, instead.

Multiple situations may arise from the assessment by troubleshooting agent 502:

The quality of the anomaly generated by anomaly detection agent 512 is insufficient for a given class of anomalies Ai. For example, anomaly detection agent 512 may produce too many false positives for a certain type of anomaly, where a false positive may be either a misclassification/misdetection of an anomaly or even an anomaly that an expert does not consider to be relevant. In this case, troubleshooting agent 502 may send a filter_issue( ) to anomaly detection agent 512 indicating that the issue cannot be troubleshooted because it seems to be irrelevant.

Troubleshooting agent 502 determines that the anomaly is relevant, but troubleshooting agent 502 is not capable of determining a good root cause. In this case, troubleshooting agent 502 may instead send a filter_issue( ) message to anomaly detection agent 512 indicating that the issue is relevant and the root cause is unknown. As a result, anomaly detection agent 512 may further filter out instances of similar issues in the future (or reduce the rate and continue to send less frequent similar issues, should automation remediation agent 514 become more capable in the future).

Troubleshooting agent 502 has identified the root cause of the anomaly. In such a case, it may send a new_AD_rule( ) message to anomaly detection agent

512 to potentially instantiate a new (static) rule on anomaly detection agent 512, should such a rule (or model) be produced. This mechanism allows for adding troubleshooting capabilities on anomaly detection agent 512 without triggering the costly troubleshooting process (in terms of time and processing) in the future. Such a rule or machine learning function may time-out to get refined in the future.

If allowed by policy, troubleshooting agent 502 may send a custom Trigger_Remediation ( ) message to automation remediation agent 514. In various implementations, this message may include any or all of the following information:

Description of the anomaly: e.g., time to join the network is abnormal.

List of entities involved: e.g., Access Point IP Address, Users affected, time-of-day the issues was detected, estimated impact on SLA Potential root cause: as determined by troubleshooting agent 502. For example, if the issue relates to a poor voice application experience for the user John, the message may list all involved entities, as determined both by anomaly detection agent 512 and troubleshooting agent 502 (and discovered during the troubleshooting process), along with the root cause (e.g., high packet loss on the WAN link connected to the router X).

Again, multiple scenarios are then possible. In some cases, automation remediation agent 514 is allowed to attempt remediation and manages to fix the issue. In this case, the system may start a monitoring period to ensure that the issue is not reappearing. Optionally, automation remediation agent 514 may request that anomaly detection agent 512 and troubleshooting agent 502 restart a full cycle to make sure that the issue has indeed been fixed, by sending a Restart_Cycle( ) message to them. If it is confirmed that the issue has been fixed, automation remediation agent 514 may log the entire process in order to fully automate the process should the same issue happen again, without having to re-trigger the entire process involving all agents. Note that automation remediation agent 514 may notify troubleshooting agent 502 that the issue has indeed been fixed and the root identified was indeed correct via a New_Troubleshooting_Rule( ) message. Such feedback will dramatically improve the troubleshooting process. For example, if troubleshooting agent 502 uses an LLM to troubleshoot the issue, it could add the information to a list of "recipes" stored in a knowledge database that will help future troubleshooting processes for the same issue.

In other instances, automation remediation agent 514 may be allowed to attempt remediation, but cannot fix the issue. In this case, the root cause identified by troubleshooting agent 502 may be incorrect and automation remediation agent 514 may send a Filter Troubleshooting ( ) message to troubleshooting agent 502, which will be used in order to further improve the troubleshooting process. For example, troubleshooting agent 502 may add to its knowledge database the list of a root cause that do not seem to the causing the issue. Automation remediation agent 514 may also send a New_AD_Rule message to anomaly detection agent 512. Such a rule would allow the anomaly detection system to report an anomaly along with recommendation on actions that could fix the issue. This type of feedback may also improve the performance of anomaly detection agent 512, which most of the time, make use of "static" rules defined by experts to suggest what MAY be a potential rule cause for an anomaly. In this situation, the root cause provided would be based on previous issues actually fixed by the system.

In another embodiment, any or all of troubleshooting agent 502, anomaly detection agent 512, and automation remediation agent 514 may trigger a process requiring user feedback from user interface 518, in order to trigger dynamic policy actions. For example, before sending the Trigger_Troubleshooting( ) or Trigger_Remediation( ) messages, anomaly detection agent 512 and troubleshooting agent 502 may request expert or user feedback, to determine whether the process should stop or continue. Additionally, the expert or other user may suggest various forms of optimizations during the whole process (e.g., troubleshooting agent 502 to send more information to automation remediation agent 514, automation remediation agent 514 to provide additional information with respect to the reason why remediation did not succeed, etc.).

FIG. 8 illustrates an example simplified procedure (e.g., a method) for multi-agent coordination for network anomaly detection, remediation, and troubleshooting using language models, in accordance with one or more implementations described herein. For example, a non-generic, specifically configured device (e.g., device 200), such as a router, firewall, controller for a network (e.g., an SDN controller or other device in communication therewith), server, or the like, may perform procedure 800 by executing stored instructions (e.g., agent control process 249 and/or network control process 248). The procedure 800 may start at step 805, and continues to step 810, where, as described in greater detail above, the device may execute a troubleshooting agent that receives an indication of an anomaly detected in a network by an anomaly detection agent. In some implementations, the anomaly is specific to a particular online application accessed via the network.

At step 815, as detailed above, the troubleshooting agent may use a language model to determine a root cause of the anomaly. In various implementations, the language model is a large language model (LLM). In a further implementation, the troubleshooting agent may determine, based on user feedback, whether the anomaly is relevant, before determining the root cause of the anomaly. In some cases, the language model determines the root cause of the anomaly based on a knowledge base of previously resolved support tickets for the network. In some cases, the troubleshooting agent may provide an indication to the anomaly detection agent when it cannot determine a root cause of a subsequent anomaly detected by the anomaly detection agent.

At step 820, the troubleshooting agent may determine whether automated remediation for the root cause is allowed by a policy, as described in greater detail above. In some cases, the policy may also select a remediation agent to remediate the root cause from among a plurality of remediation agents.

At step 825, as detailed above, the troubleshooting agent may provide a remediation request to a remediation agent in the network to remediate the root cause of the anomaly, when the policy allows automated remediation for the root cause. In some instances, the troubleshooting agent may also receive an indication that the remediation agent was able to remediate the root cause of the anomaly and, in response, use the indication to update a knowledge base that the troubleshooting agent uses to troubleshoot anomalies. In some cases, the troubleshooting agent may also provide an anomaly detection rule to the anomaly detection agent that causes the anomaly detection agent to associate the root cause with a further anomaly that it detects. In another implementation, the troubleshooting agent may receive a filtering request from the remediation agent to prevent the troubleshooting agent from sending a subsequent remediation request, when the remediation agent is unable to remediate the root cause of the anomaly.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for multi-agent coordination for network anomaly detection, remediation, and troubleshooting using language models, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof.

Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:
receiving, at a troubleshooting agent executed by a device, an indication of an anomaly detected in a network by an anomaly detection agent;
using, by the troubleshooting agent, a language model to determine a root cause of the anomaly;
determining, by the troubleshooting agent, whether automated remediation for the root cause is allowed by a policy;
providing, by the troubleshooting agent, a remediation request to a remediation agent in the network to remediate the root cause of the anomaly, when the policy allows automated remediation for the root cause; and
receiving, at the troubleshooting agent, a filtering request from the remediation agent to prevent the troubleshooting agent from sending a subsequent remediation request, when the remediation agent is unable to remediate the root cause of the anomaly.

2. The method as in claim 1, wherein the language model is a large language model.

3. The method as in claim 1, wherein the language model determines the root cause of the anomaly based on a knowledge base of previously resolved support tickets for the network.

4. The method as in claim 1, further comprising:
receiving, at the troubleshooting agent, an indication that the remediation agent was able to remediate the root cause of the anomaly; and, in response,
using the indication to update a knowledge base that the troubleshooting agent uses to troubleshoot anomalies.

5. The method as in claim 1, further comprising:
providing, by the troubleshooting agent, an anomaly detection rule to the anomaly detection agent that causes the anomaly detection agent to associate the root cause with a further anomaly that it detects.

6. The method as in claim 1, further comprising:
providing, by the troubleshooting agent, an indication to the anomaly detection agent when it cannot determine a root cause of a subsequent anomaly detected by the anomaly detection agent.

7. The method as in claim 1, further comprising:
determining, by the troubleshooting agent and based on user feedback, whether the anomaly is relevant, before determining the root cause of the anomaly.

8. The method as in claim 1, wherein the troubleshooting agent sends the remediation request to the remediation agent according to a policy that selects the remediation agent from among a plurality of remediation agents.

9. The method as in claim 1, wherein the anomaly is specific to a particular online application accessed via the network.

10. An apparatus, comprising:
one or more network interfaces;
a processor coupled to the one or more network interfaces and configured to execute one or more processes; and
a memory configured to store a process that is executable by the processor, the process when executed configured to:
receive, at a troubleshooting agent executed by the apparatus, an indication of an anomaly detected in a network by an anomaly detection agent;
use, by the troubleshooting agent, a language model to determine a root cause of the anomaly;
determine, by the troubleshooting agent, whether automated remediation for the root cause is allowed by a policy;
provide, by the troubleshooting agent, a remediation request to a remediation agent in the network to remediate the root cause of the anomaly, when the policy allows automated remediation for the root cause; and
receive, at the troubleshooting agent, a filtering request from the remediation agent to prevent the troubleshooting agent from sending a subsequent remediation request, when the remediation agent is unable to remediate the root cause of the anomaly.

11. The apparatus as in claim 10, wherein the language model is a large language model.

12. The apparatus as in claim 10, wherein the language model determines the root cause of the anomaly based on a knowledge base of previously resolved support tickets for the network.

13. The apparatus as in claim 10, wherein the process when executed is further configured to:
receive, at the troubleshooting agent, an indication that the remediation agent was able to remediate the root cause of the anomaly; and, in response,
use the indication to update a knowledge base that the troubleshooting agent uses to troubleshoot anomalies.

14. The apparatus as in claim 10, wherein the process when executed is further configured to:

provide, by the troubleshooting agent, an anomaly detection rule to the anomaly detection agent that causes the anomaly detection agent to associate the root cause with a further anomaly that it detects.

15. The apparatus as in claim 10, wherein the process when executed is further configured to:

provide, by the troubleshooting agent, an indication to the anomaly detection agent when it cannot determine a root cause of a subsequent anomaly detected by the anomaly detection agent.

16. The apparatus as in claim 10, wherein the process when executed is further configured to:

determine, by the troubleshooting agent and based on user feedback, whether the anomaly is relevant, before determining the root cause of the anomaly.

17. The apparatus as in claim 10, wherein the troubleshooting agent sends the remediation request to the remediation agent according to a policy that selects the remediation agent from among a plurality of remediation agents.

18. A tangible, non-transitory, computer-readable medium storing program instructions that cause a device to execute a process comprising:

receiving, at a troubleshooting agent executed by the device, an indication of an anomaly detected in a network by an anomaly detection agent;

using, by the troubleshooting agent, a language model to determine a root cause of the anomaly;

determining, by the troubleshooting agent, whether automated remediation for the root cause is allowed by a policy;

providing, by the troubleshooting agent, a remediation request to a remediation agent in the network to remediate the root cause of the anomaly, when the policy allows automated remediation for the root cause; and receiving, at the troubleshooting agent, a filtering request from the remediation agent to prevent the troubleshooting agent from sending a subsequent remediation request, when the remediation agent is unable to remediate the root cause of the anomaly.

\* \* \* \* \*